(12) United States Patent
Okutani et al.

(10) Patent No.: US 7,318,033 B2
(45) Date of Patent: Jan. 8, 2008

(54) METHOD, APPARATUS AND PROGRAM FOR RECOGNIZING, EXTRACTING, AND SPEECH SYNTHESIZING STRINGS FROM DOCUMENTS

(75) Inventors: Yasuo Okutani, Kanagawa (JP); Tetsuo Kosaka, Yonezawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 10/627,639

(22) Filed: Jul. 28, 2003

(65) Prior Publication Data

US 2004/0088165 A1 May 6, 2004

(30) Foreign Application Priority Data

Aug. 2, 2002 (JP) ............................. 2002-226586

(51) Int. Cl.
*G10L 13/00* (2006.01)

(52) U.S. Cl. .................................... 704/260; 704/274

(58) Field of Classification Search ................ 704/258, 704/260, 270, 271, 272, 274; 355/112
See application file for complete search history.

(56) References Cited

U.S. PATENT DOCUMENTS

| | | | |
|---|---|---|---|
| 5,220,629 A | | 6/1993 | Kosaka et al. |
| 5,227,894 A | | 7/1993 | Yoshida |
| 5,337,349 A | * | 8/1994 | Furohashi et al. ..... 379/100.14 |
| 5,555,343 A | * | 9/1996 | Luther ......................... 704/260 |
| 6,021,388 A | | 2/2000 | Otsuka et al. |
| 6,035,061 A | | 3/2000 | Katsuyama et al. |
| 6,052,663 A | * | 4/2000 | Kurzweil et al. ........... 704/260 |
| 6,115,482 A | * | 9/2000 | Sears et al. .................. 382/114 |
| 6,256,610 B1 | * | 7/2001 | Baum .......................... 704/260 |
| 6,624,803 B1 | * | 9/2003 | Vanderheiden et al. ..... 345/156 |
| 6,867,875 B1 | * | 3/2005 | Kanai et al. ................ 358/1.15 |
| 6,877,921 B2 | * | 4/2005 | Hirota et al. ................ 400/625 |
| 6,962,453 B2 | * | 11/2005 | Hirota et al. ................ 400/625 |
| 7,099,507 B2 | | 8/2006 | Ouchi |
| 7,190,480 B2 | * | 3/2007 | Sturgeon et al. ........... 358/1.17 |
| 2001/0047259 A1 | | 11/2001 | Okutani et al. |
| 2003/0097264 A1 | | 5/2003 | Kosaka et al. |

FOREIGN PATENT DOCUMENTS

| | | |
|---|---|---|
| JP | 02-019984 | 1/1990 |
| JP | 04-016055 | 1/1992 |
| JP | 04-024885 | 1/1992 |
| JP | 04-096564 | 3/1992 |
| JP | 7-302017 | 11/1995 |
| JP | 8-70378 | 3/1996 |
| JP | 09-134406 | 5/1997 |
| JP | 09-298658 | 11/1997 |
| JP | 10-167523 | 6/1998 |
| JP | 11-085457 | 3/1999 |
| JP | 2000-10755 | 1/2000 |
| JP | 2000-148788 | 5/2000 |
| JP | 2001-086279 | 3/2001 |

* cited by examiner

*Primary Examiner*—Martin Lerner
(74) *Attorney, Agent, or Firm*—Fitzpatrick, Cella, Harper & Scinto

(57) ABSTRACT

Even when a copying machine with a voice guidance function is used, a problem of wastefully copying wrong documents or documents with missing pages remains unsolved for visually impaired persons. To this end, a document image is read, character strings on the read document image are recognized, a character string indicating the contents of the document is chosen from the recognized character strings, the chosen character string is converted into speech, and synthetic speech is output.

5 Claims, 12 Drawing Sheets

(TEXT-TO-SPEECH CONVERSION EXAMPLE)

FIRST PAGE IS ... GUIDE TO XX.

SECOND PAGE IS ... TABLE OF CONTENTS.

THIRD PAGE IS ... 1. INTRODUCTION.

FOURTH PAGE IS ... 2. WHAT IS XX.

:
:

FIG. 4A (CHARACTER STRING CHOICE RESULT)

GUIDE TO XX
TABLE OF CONTENTS
1. INTRODUCTION
2. WHAT IS XX

⋮

FIG. 4B (TEXT-TO-SPEECH CONVERSION EXAMPLE)

FIRST PAGE IS ... GUIDE TO XX.
SECOND PAGE IS ... TABLE OF CONTENTS.
THIRD PAGE IS ... 1. INTRODUCTION.
FOURTH PAGE IS ... 2. WHAT IS XX.

⋮

(CHARACTER STRING CHOICE RESULT)

1
2
3
4

(TEXT-TO-SPEECH CONVERSION EXAMPLE)

1 PAGE.
2 PAGE.
3 PAGE.
4 PAGE.

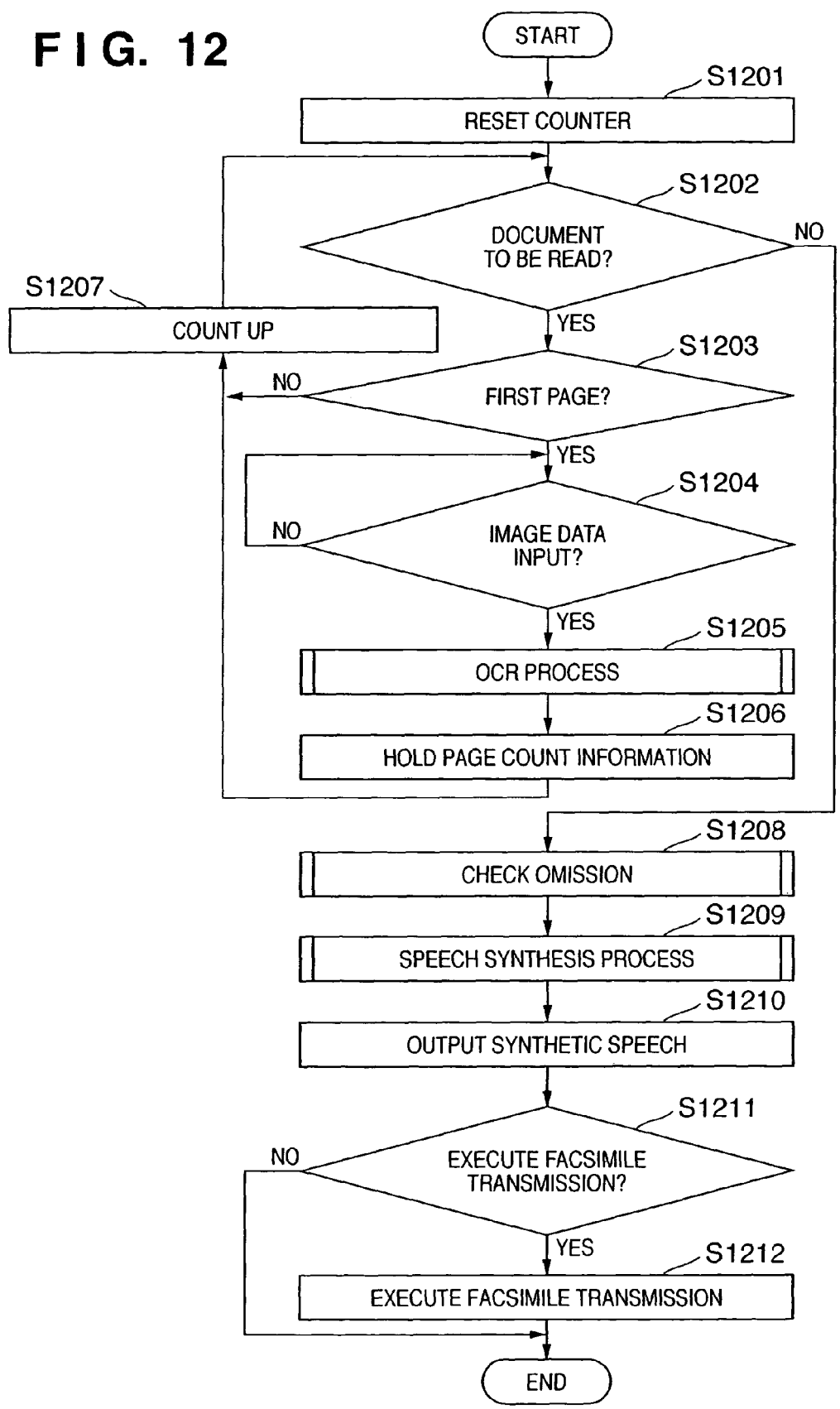

METHOD, APPARATUS AND PROGRAM FOR RECOGNIZING, EXTRACTING, AND SPEECH SYNTHESIZING STRINGS FROM DOCUMENTS

FIELD OF THE INVENTION

The present invention relates to an information processing apparatus and method and, more particularly, to an information process for audibly outputting information indicating contents of a document and information indicating the number of pages or sheets of documents.

BACKGROUND OF THE INVENTION

In recent years, activities that assist and promote social evolution of handicapped persons have been well-practiced. In U.S.A., Section 508 of Rehabilitation Act has been enforced in 2001, and similar legislation will be introduced in European countries and Japan in the future. However, in practice, it is hard to say that we have in place an environment required for handicapped persons to work well. For example, when a visually impaired person uses office equipment such as a copying machine, facsimile apparatus, and the like in an office, there are many problems to be solved.

As a technique that supports use of office equipment by a visually impaired person, voice guidance disclosed in Japanese Patent Laid-Open No. 7-302017 is known. As a means for informing a visually impaired person of the state of a copying machine, voice information disclosed in Japanese Patent Laid-Open No. 10-167523 is known. Both these techniques hold pre-recorded voice messages in equipment and reproduce the held voice messages in accordance with user's operations and internal states.

Some facsimile apparatuses audibly inform the user of call reception. For example, a facsimile apparatus described in Japanese Patent Laid-Open No. 8-070378 makes character recognition of the destination of a facsimile document based on received facsimile data to specify a personal name who should receive the facsimile document, synthesizes a voice message prepared in advance, and informs that receiver of reception of the facsimile document via an extension telephone. Furthermore, Japanese Patent Laid-Open No. 2000-10755 discloses a technique which makes character recognition of contents of a received facsimile document, converts the character recognition result into a voice message by speech synthesis, and reads aloud the voice message.

When a copying machine or facsimile apparatus is used without confirming the contents of a printed document, a document including errors or a document other than that to be copied or transmitted may be copied or transmitted by facsimile. Hence, a wasteful copy may be formed, or such document lead to trouble. Furthermore, in terms of waste of paper resources, omission of pages or wrong copying may be found after a large number of copies are formed.

For visually impaired persons, such problems remain unsolved even when they can use the aforementioned voice guidance, voice information function, and call reception informing function.

SUMMARY OF THE INVENTION

The present invention has been made to solve the aforementioned problems individually or together, and has as its object to audibly output information that represents the contents of a document. It is another object of the present invention to audibly output information according to the number of pages or sheets of documents.

In order to achieve the above objects, a preferred embodiment of the present invention discloses an information processing apparatus comprising:

a reader, arranged to read a document image;

a recognition section, arranged to recognize character strings of the read document image;

a extractor, arranged to extract a character string indicating contents of a document from the recognized character strings; and a synthesizer, arranged to synthesize and output speech based on the chosen character string.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 and FIGS. 4A and 4B are views for explaining text-to-speech conversion of titles;

FIG. 12 is a flow chart showing a scan content informing process.

DESCRIPTION OF THE PREFERRED EMBODIMENTS

An information processing apparatus according an embodiment of the present invention will be described in detail hereinafter with reference to the accompanying drawings.

First Embodiment

Figure 1:
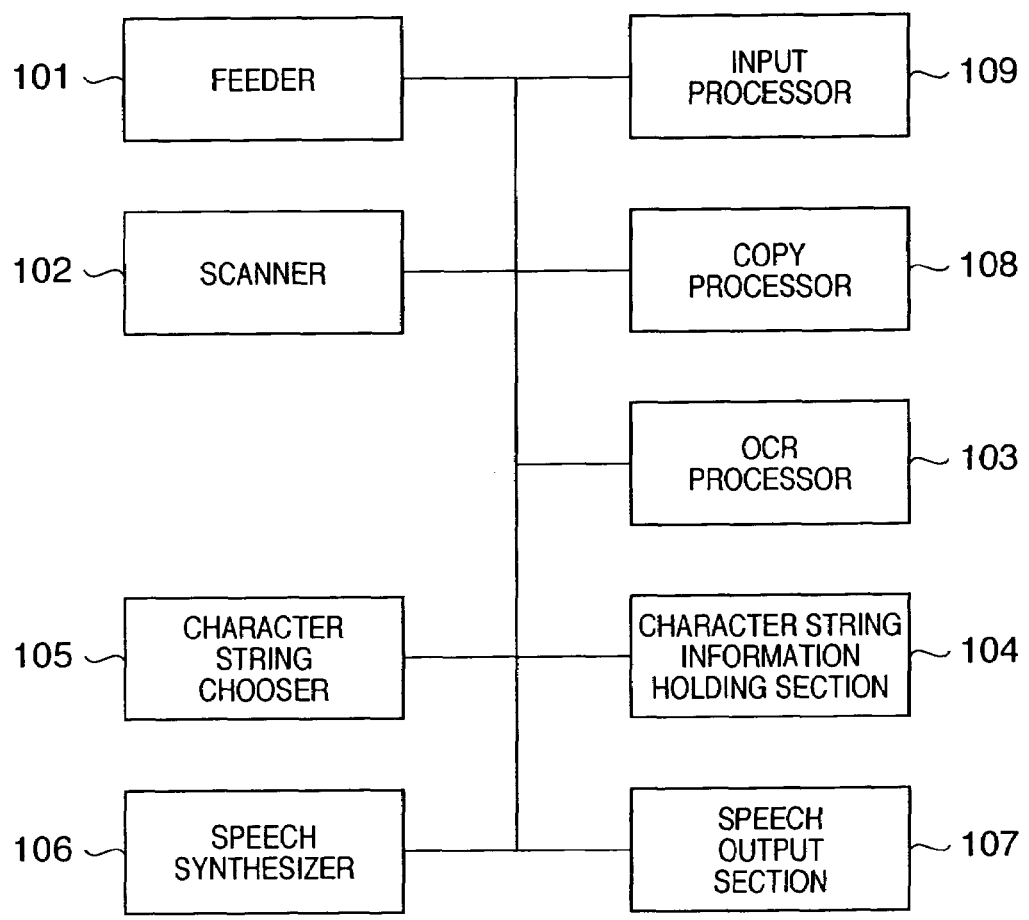
FIG. 1 is a block diagram showing the arrangement of an information processing apparatus which informs scan contents.

FIG. 1 is a block diagram showing the arrangement of an information processing apparatus that informs scan contents according to this embodiment. The first embodiment will exemplify a case wherein the information processing apparatus of this embodiment is mounted in a copying machine, but may be prepared independently of the copying machine.

In accordance with a user's instruction indicating execution of copy, a copy count, and the like, which is input at an input processor 109, a feeder 101 feeds documents to a scanner 102 one by one, the scanner 102 reads an image of the fed document, and a copy processor 108 outputs a copy of the document on the basis of the read image data. These components are the same as those in a normal copying machine.

On the other hand, an OCR processor 103 recognizes characters from image data read by the scanner 102. A character string information holding section 104 holds character string information and associated information recognized by the OCR processor 103. A character string chooser 105 chooses a character string to be read aloud from the character string information held in the character string information holding section 104. A speech synthesizer 106 converts the character string chosen by the character string chooser 105 into speech. A speech output section 107 outputs synthetic speech generated by the speech synthesizer 106. These components are those unique to the information processing apparatus of this embodiment.

Note that the character string information holding section 104 comprises a semiconductor memory such as a RAM or the like, and the speech output section 107 comprises an amplifier, loudspeaker, and the like for an audio signal. The arrangement of the information processing apparatus except for the character string information holding section 104 and speech output section 107 is implemented by a dedicated LSI or a CPU which executes a program stored in a ROM or the like using a RAM as a work memory.

Figure 2:
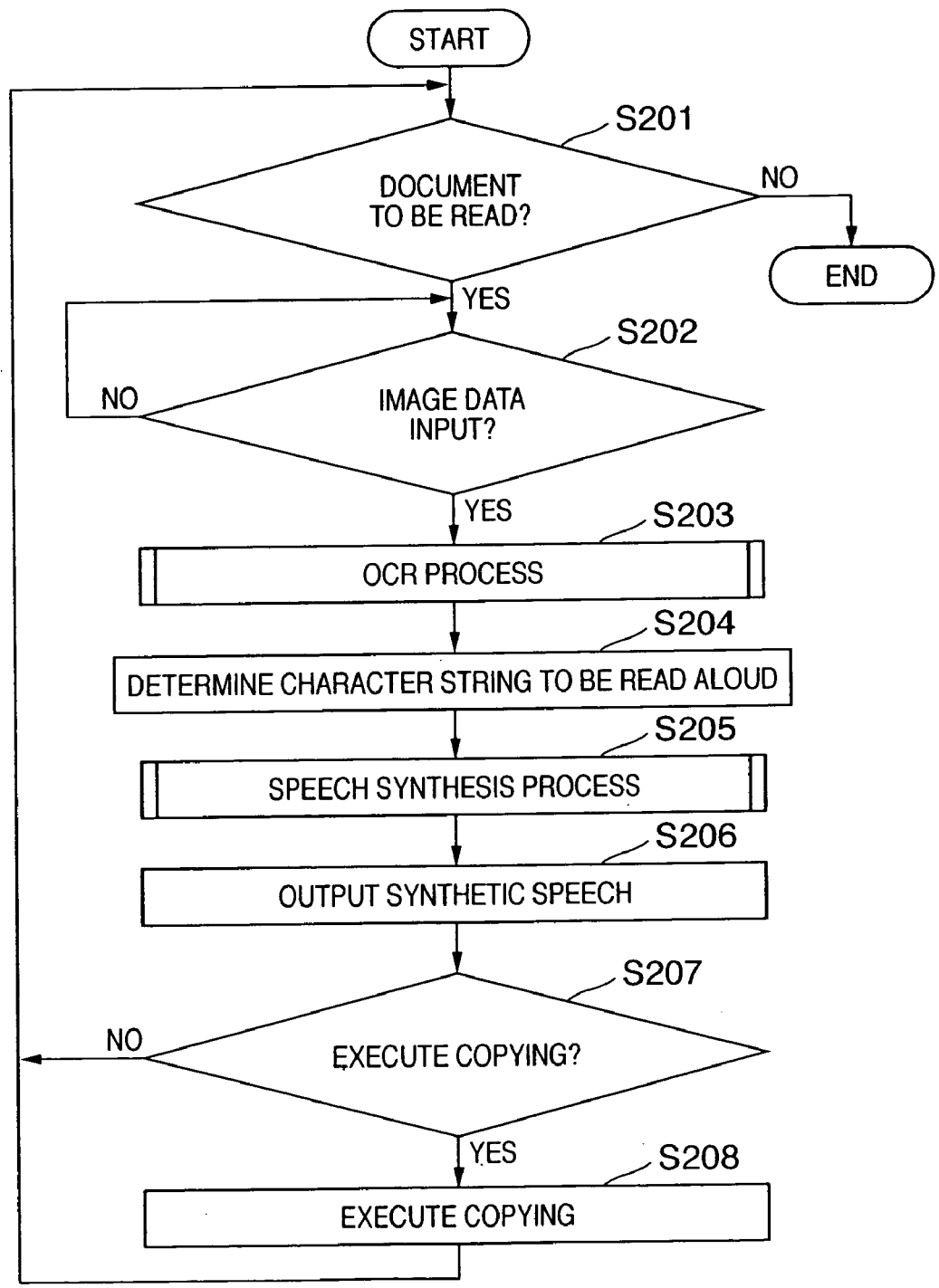
FIG. 2 is a flow chart showing a scan content informing process.

FIG. 2 is a flow chart showing a scan content informing process to be executed by the information processing apparatus. This process is executed when, for example, the feeder 101 begins to feed a document.

It is determined based on information which is obtained from the feeder 101 and indicates if a document to be fed is present, whether or not a document to be read is present (S201). If no document to be read is present, this process ends; otherwise, the control waits for image data of the next document input from the scanner 102 (S202).

If the image data of the next document is input from the scanner 102, the OCR processor 103 recognizes and extracts a character string from the image data, and stores the extracted character string in the character string information holding section 104 in correspondence with the image data (S203). Note that the information stored in the character string information holding section 104 includes the extracted character string, the position of that character string on the document, character size, color, and character direction (horizontal or vertical writing).

The character string chooser 105 specifies a character string that may indicate contents of the document on the basis of the information extracted and held in the character string information holding section 104 (S204). For example, if a title of a document is to be specified, a character string which has a large character size (equal to or larger than a predetermined size) and is located at a specific location of a document image (e.g., near the center of the document, near the center of an upper portion, or a header) among those held in the character string information holding section 104 is specified as the title of the document.

The speech synthesizer 106 converts the character string specified by the character string chooser 105 into speech (S205), and the speech output section 107 outputs synthetic speech (S206). The user who listened to this speech output determines whether or not to execute copying, and inputs the determination result via the input processor 109. Upon detection of a copying execution instruction (S207), the copy processor 108 is controlled to copy a corresponding document image (S208), and the flow then returns to step S201. On the other hand, if the user instructs to cancel copying (S207), the copy processor 108 is controlled not to copy a corresponding document image, and the flow returns to step S201.

Figure 3:
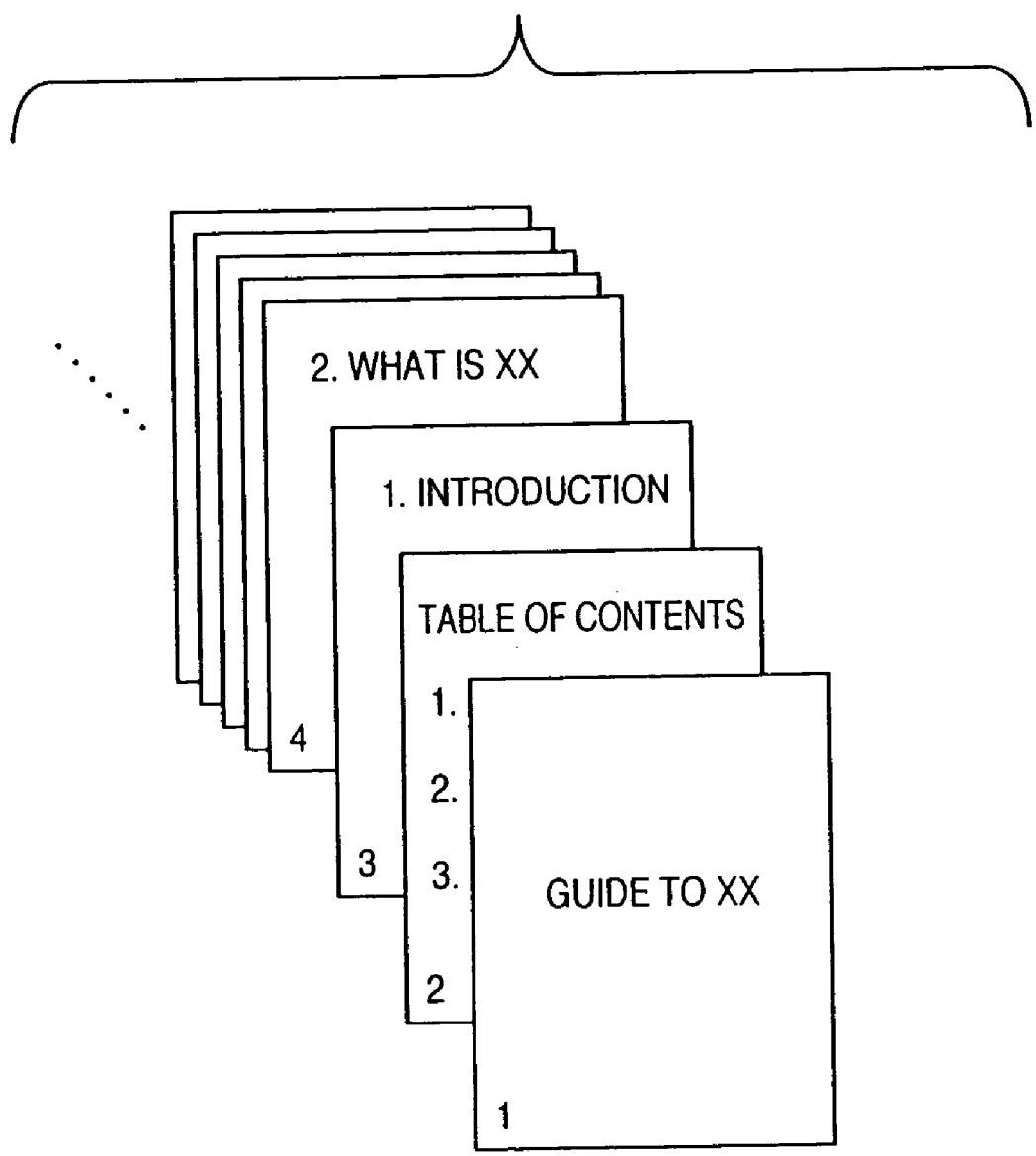

FIG. 3 and FIGS. 4A and 4B are views for explaining text-to-speech conversion of a title. FIG. 3 shows an example of general documents (papers), in which a page number is printed on the lower left corner of each page of a plurality of documents, and a title is printed on an upper portion of each page. FIG. 4A shows choice results of the character string chooser 105, and FIG. 4B shows text-to-speech conversion examples of the speech synthesizer 106.

That is, a character string which is recognized as a title is chosen from each page, and the title is read aloud in the following format:

"(page number)-th page is (chosen character string)"

(example) "second page is table of contents"

In this way, characters are recognized from image data obtained by reading a document image, a character string that can specify the contents of the document is chosen from the recognized character strings, and the chosen character string is read aloud by speech synthesis. Hence, the user can easily confirm the contents of a document prior to execution of copying.

Of course, a character string to be read aloud is not limited to a title. For example, full text of a document may be read aloud, or several lines or a part of a start section of each page may be read aloud. In this case, the character string chooser 105 chooses the first line or several lines (may or may not include a title) using the information (indicating, e.g., horizontal or vertical writing and the like) held in the character string information holding section 104.

When only page numbers are read aloud, the user can confirm excess or deficiency of pages. In this case, the character string chooser 105 chooses a numeral located at an end portion of a document image using information held in the character string information holding section 104 such as the position information, character size information, character string type (numeral or not), and the like.

Figure 5A:
FIGS. 5A and 5B show choice results of character strings and text-to-speech conversion examples upon reading aloud page numbers.
Figure 5B:

FIGS. 5A and 5B show choice results of character strings and text-to-speech conversion examples upon reading aloud page numbers.

Figure 6:
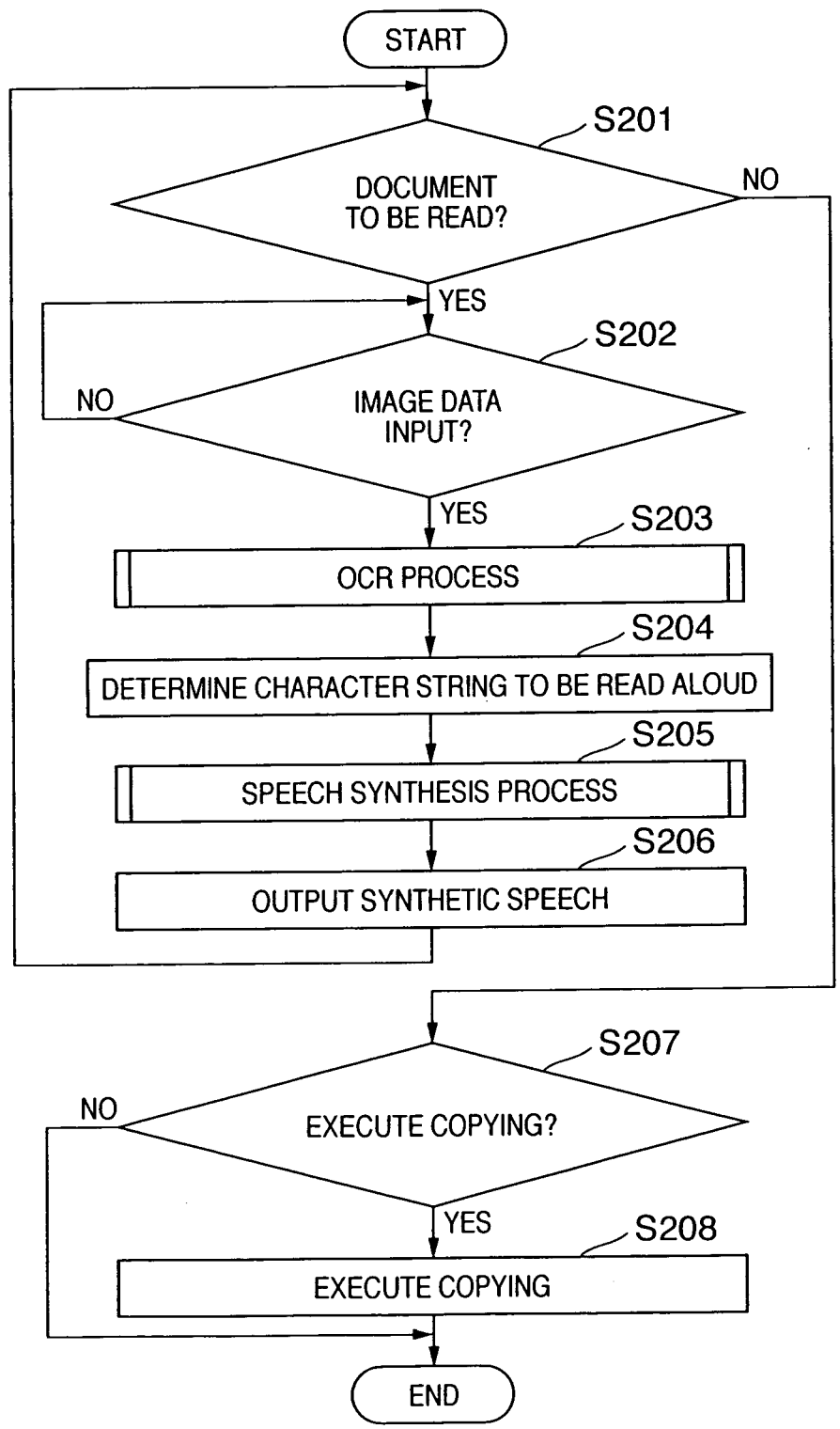
FIG. 6 is a flow chart showing a scan content informing process.

In the above description, the apparatus confirms with the user if each document is to be copied. Alternatively, documents may be pre-scanned one by one to read aloud their specific portions, and upon completion of pre-scans and text-to-speech conversion for all the documents, the apparatus may confirm with the user whether or not all the documents are to be copied. FIG. 6 is a flow chart showing this sequence. The difference from the sequence shown in FIG. 2 is as follows. That is, after synthetic speech is output in step S206, the flow returns to step S201. If it is determined in step S201 that no document to be read remains, the flow jumps to step S207 to determine whether or not copying is to be executed.

Second Embodiment

An information processing apparatus according to the second embodiment of the present invention will be described below. Note that the same reference numerals in the second embodiment denote the same parts as in the first embodiment, and a detailed description thereof will be omitted.

In the above embodiment, the contents of documents are read aloud one by one. Also, it is effective to point out defects of documents. The defects of documents include, e.g., missing pages. If page numbers are assigned to respective pages of documents, these page numbers are extracted, and an irregular order of page numbers, missing page numbers, and the like are detected. Then, a message "order of fourth and fifth pages is reversed", "sixth page is missing", or the like is generated for the user using synthetic speech.

Figure 7:
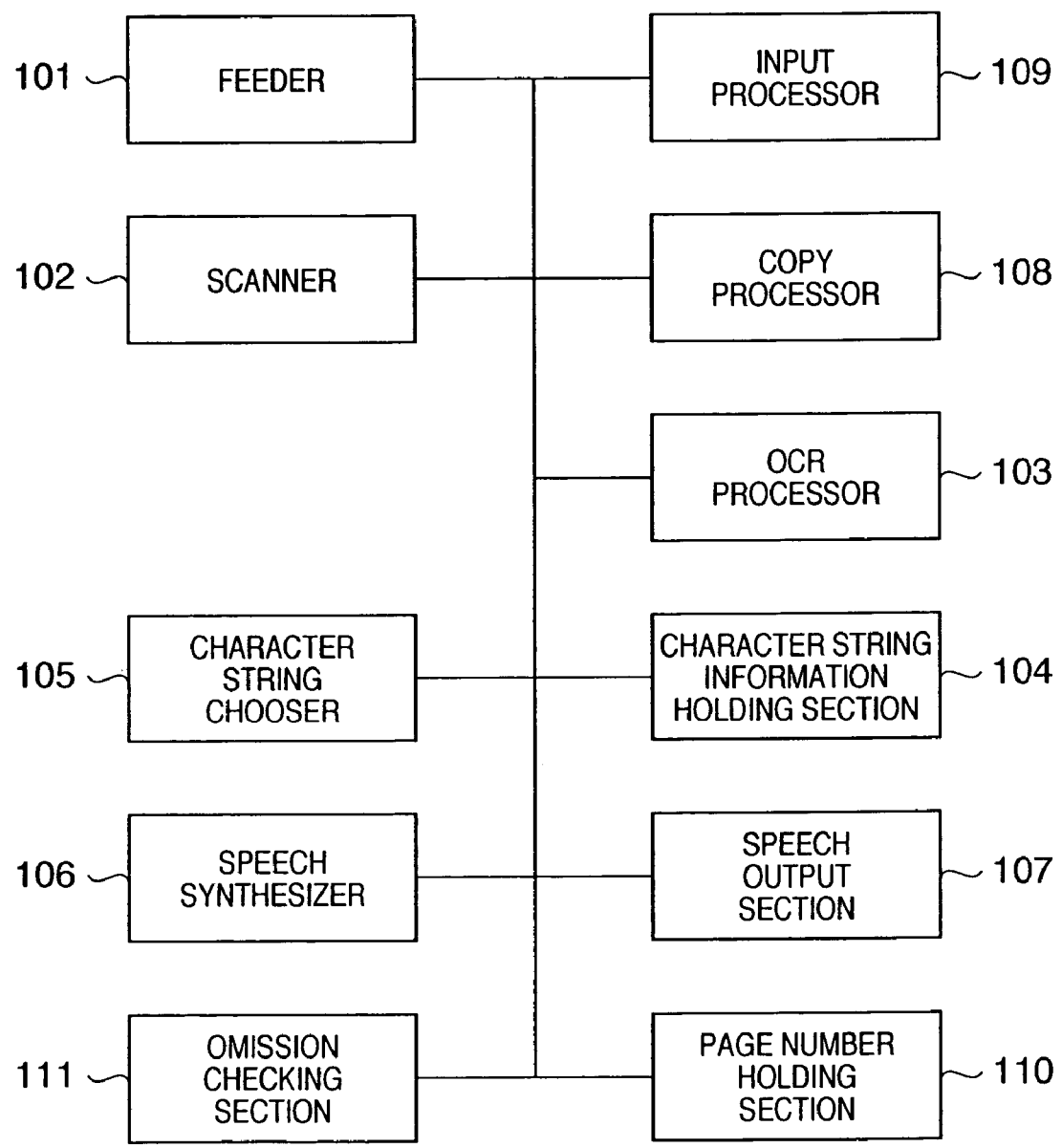
FIG. 7 is a block diagram showing the arrangement of an information processing apparatus which informs scan contents.

FIG. 7 is a block diagram showing the arrangement of an information processing apparatus that informs scan contents. Compared to the arrangement shown in FIG. 1, a page number holding section 110 and omission checking section 111 are added.

The page number holding section 110 sequentially stores page numbers extracted by the OCR processor 103 from document images read by the scanner 102. The omission checking section 111 detects an irregular page order and missing pages from a page number string stored in the page number holding section 110. Note that the page number holding section 110 comprises a semiconductor memory such as a RAM or the like, and the omission checking section 111 is implemented by a dedicated LSI or a CPU which executes a program stored in a ROM or the like using a RAM as a work memory.

Figure 8:
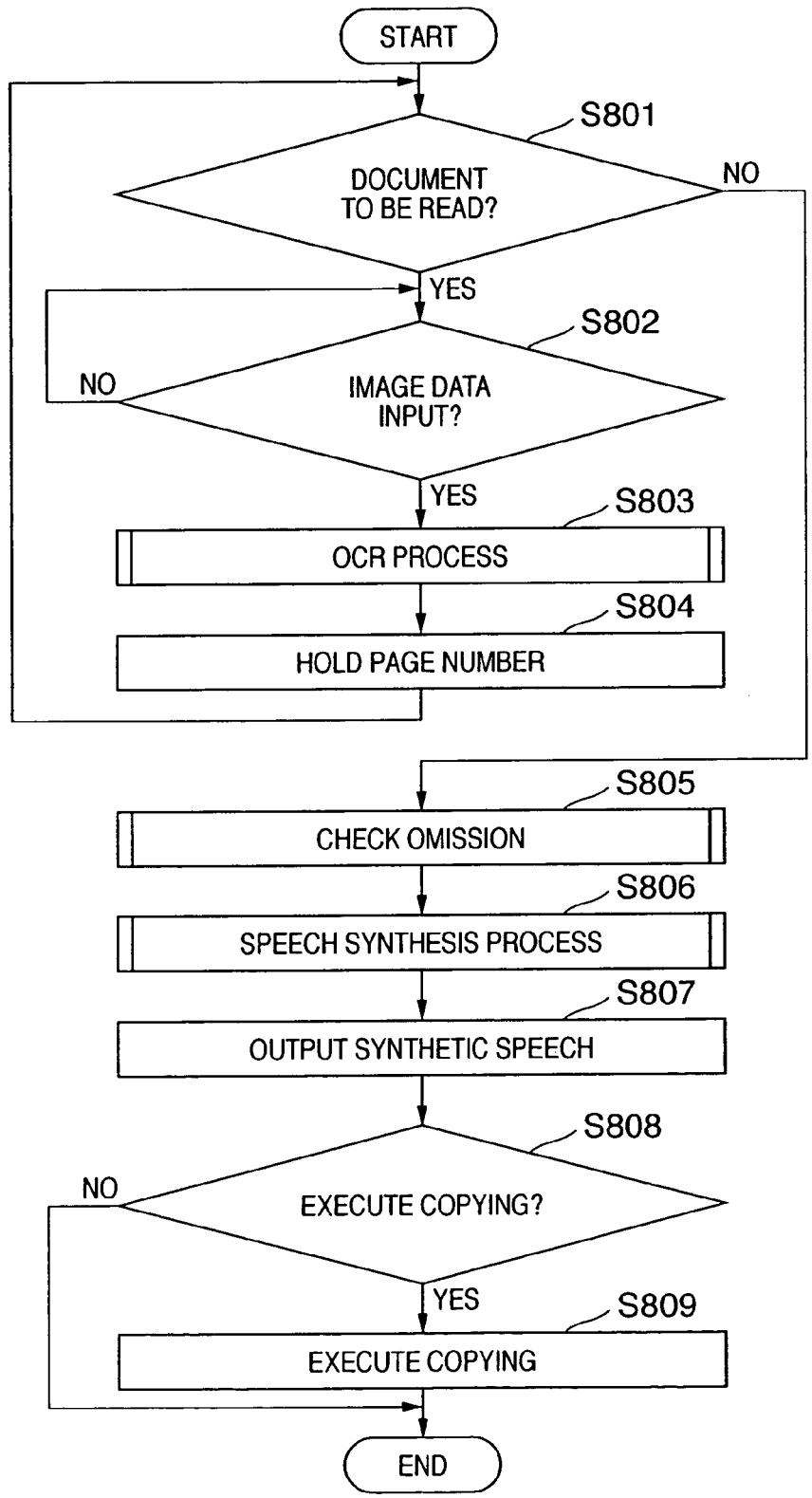
FIG. 8 is a flow chart showing a scan content informing process.

FIG. 8 is a flow chart showing the scan content informing process to be executed by the information processing apparatus. This process is executed when, for example, the feeder 101 begins to feed a document.

It is determined based on information which is obtained from the feeder 101 and indicates if a document to be fed is present, whether or not a document to be read is present (S801). If a document to be read is present, the control waits for image data of the next document input from the scanner 102 (S802).

If the image data of the next document is input from the scanner 102, the OCR processor 103 recognizes and extracts a character string indicating a page number from the image data (S803), and stores the extracted character string indicating the page number in the page number holding section 110 (S804). After that, the flow returns to step S801, and steps S801 to S804 are repeated until all documents have been read.

If no document to be read remains, the omission checking section 111 checks an irregular page order, missing pages, and the like on the basis of a page number string held in the page number holding section 110 (S805). If no defect is found, the speech synthesizer 106 generates a message "document pages have no defects" or the like (S806), and the speech output section 107 outputs that message (S807). On the other hand, if any defect is found, the speech synthesizer 106 generates a message "order of fourth and fifth pages is reversed", "sixth page is missing", or the like (S806), and the speech output section 107 outputs that message (S807).

The user who listened to this speech output determines whether or not to execute copying, and inputs the determination result via the input processor 109. Upon detection of a copying execution instruction (S808), the copy processor 108 is controlled to copy documents (S809), thus ending the process. On the other hand, if the user instructs to cancel copying (S808), the copy processor 108 is controlled not to copy any documents, and the process ends.

Upon reading page numbers, image data of documents input in step S802 may be stored in a memory, and if the user instructs to execute copying in step S808, the image data stored in the memory may be passed to the copy processor 108 to form copies.

In this way, page numbers are recognized from image data obtained by reading document images, the order of documents (page order) and missing pages are checked based on the recognized page numbers, and the checking result is read aloud by speech synthesis. Hence, the user can easily confirm the order of documents and missing pages prior to execution of copying.

Upon outputting the aforementioned simple messages "document pages have no defects", "order of fourth and fifth pages is reversed", "sixth page is missing", and the like, speech data may be stored in, e.g., a nonvolatile memory of the speech synthesizer 106, and speech data or a combination of speech data may be chosen and played back in accordance with the checking result in step S805 without using speech synthesis.

Third Embodiment

An information processing apparatus according to the third embodiment of the present invention will be described below. Note that the same reference numerals in the third embodiment denote the same parts as in the first and second embodiments, and a detailed description thereof will be omitted.

In the above embodiments, the information processing apparatus that informs scan contents is mounted in (or coupled to) the copying machine. However, the information processing apparatus may be mounted in (or coupled to) arbitrary equipment such as a facsimile apparatus, hybrid machine, or the like. For example, the information processing apparatus of this embodiment may be mounted in (or coupled to) a scanner. In such case, the user can confirm the contents of a document to be read, and such arrangement can contribute to preservation of consistency between information registered in, e.g., a document management tool and data read from documents.

Figure 9:
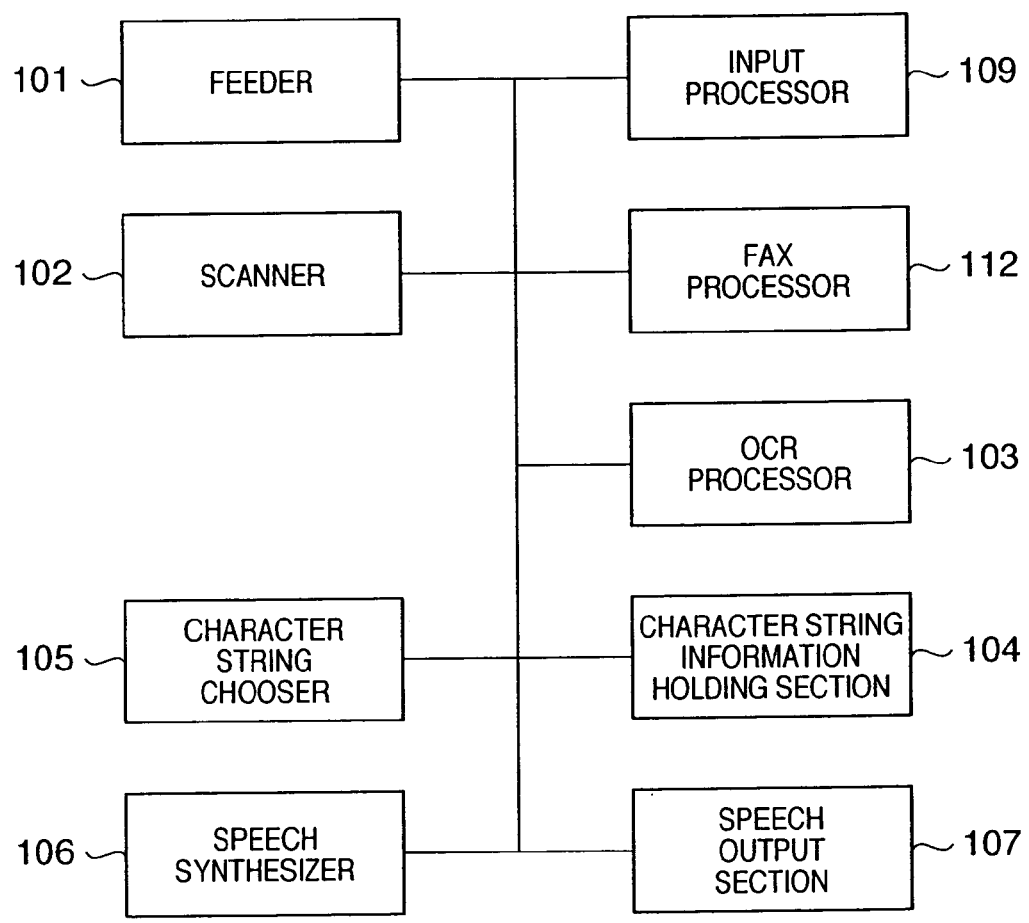
FIG. 9 is a block diagram showing an example in which the information processing apparatus that informs scan contents is mounted in a facsimile apparatus.

FIG. 9 is a block diagram showing an example in which the information processing apparatus that informs scan contents is mounted in a facsimile apparatus. This apparatus comprises a FAX processor 112 that makes facsimile communications in place of the copy processor 108 shown in FIG. 1.

Figure 10:
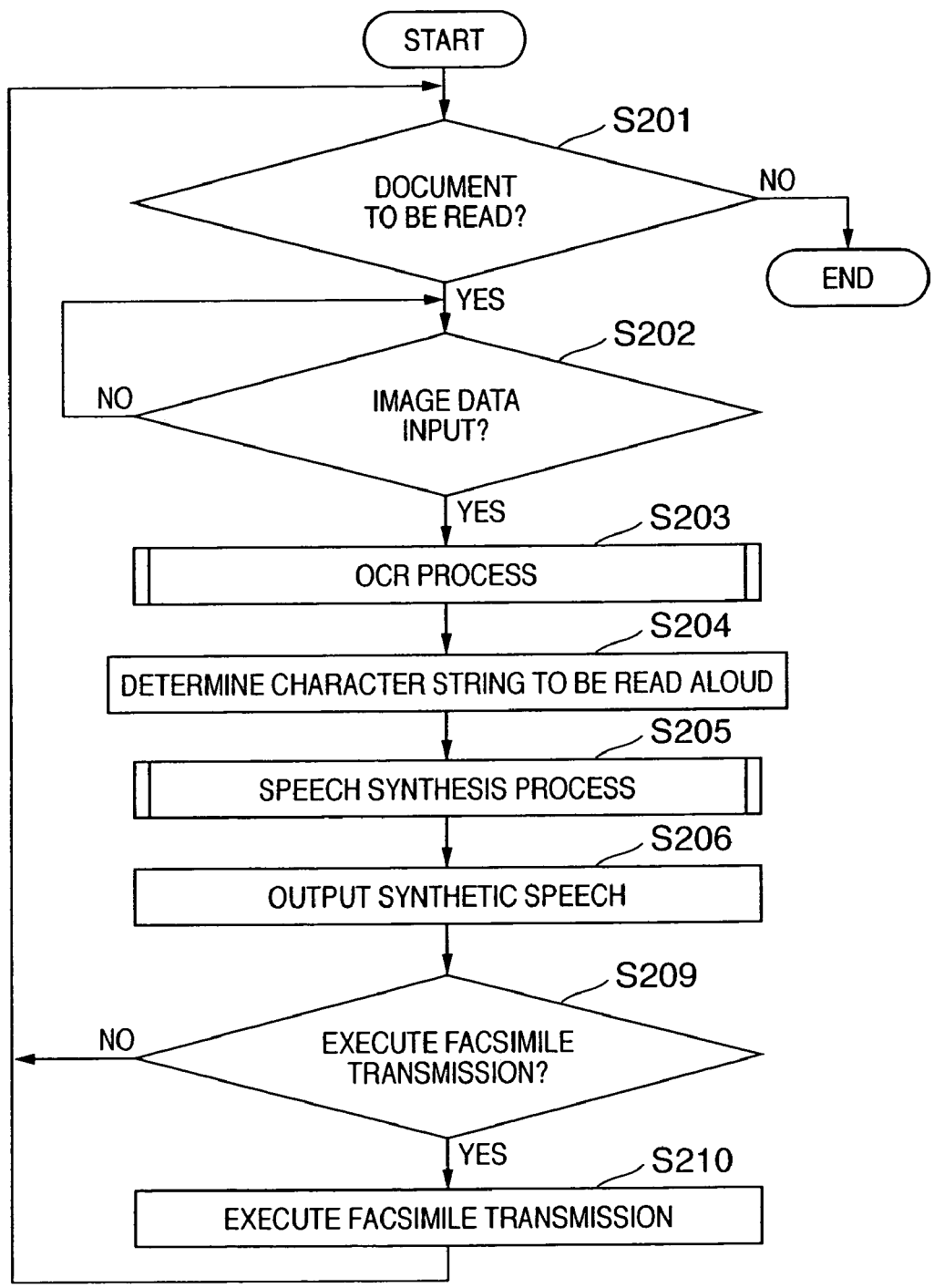
FIG. 10 is a flow chart showing a scan content informing process.

FIG. 10 is a flow chart showing the scan content informing process to be executed by the information processing apparatus. This process is executed when, for example, the feeder 101 begins to feed a document.

In the sequence shown in FIG. 2, it is checked in step S207 if copying is to be executed. If the user instructs to execute copying, a document is copied in step S208. However, in the sequence shown in FIG. 10, it is checked in step S209 if facsimile transmission is to be executed. If the user instructs to execute facsimile transmission, facsimile transmission is executed in step S210.

In this way, characters are recognized from image data obtained by reading a document image, a character string that can specify the contents of the document is chosen from the recognized character strings, and the chosen character string is read aloud by speech synthesis. Hence, the user can easily confirm the contents of a document prior to execution of facsimile transmission.

Of course, a character string to be read aloud is not limited to a title. For example, full text of a document may be read aloud, or several lines or a part of a start section of each page may be read aloud. In this case, the character string chooser 105 chooses the first line or several lines (may or may not include a title) using the information (indicating, e.g., horizontal or vertical writing and the like) held in the character string information holding section 104.

When only page numbers are read aloud, the user can confirm excess or deficiency of pages. In this case, the character string chooser 105 chooses a numeral located at an end portion of a document image using information held in the character string information holding section 104 such as the position information, character size information, character string type (numeral or not), and the like.

In the above description, the apparatus confirms with the user if facsimile transmission of each document is to be executed. Alternatively, documents may be pre-scanned one by one to read aloud their specific portions, and upon completion of pre-scans and text-to-speech conversion for all the documents, the apparatus may confirm with the user whether or not facsimile transmission of all the documents is to be executed. This process is suited to the facsimile apparatus.

Fourth Embodiment

An information processing apparatus according to the fourth embodiment of the present invention will be described below. Note that the same reference numerals in the fourth embodiment denote the same parts as in the first to third embodiments, and a detailed description thereof will be omitted.

The first page of documents which are to be transmitted by facsimile is normally used as a facsimile header and, for example, such header often describes that "eight pages will be transmitted including cover page" or the like. Therefore, information indicating the number of pages of documents is recognized, and is compared with the actual number of pages of documents. If these two values are different, a message can be generated for the user by synthetic speech.

Figure 11:
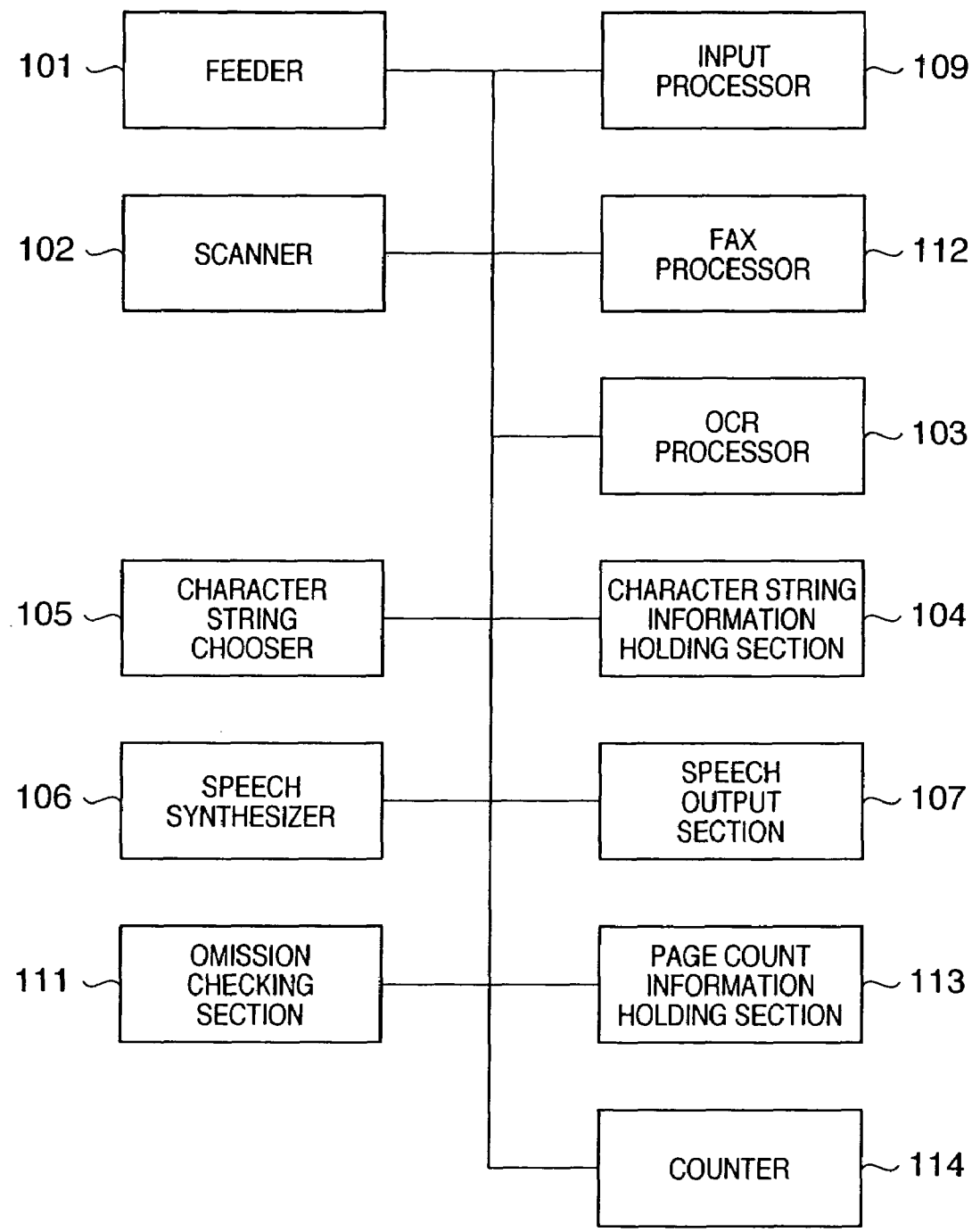
FIG. 11 is a block diagram showing the arrangement of an information processing apparatus which informs scan contents.

FIG. 11 is a block diagram showing the arrangement of an information processing apparatus that informs scan contents. Compared to the arrangement shown in FIG. 9, an omission checking section 111, page count information holding section 113, and counter 114 are added.

The page count information holding section 113 holds a recognition result of information which is described on the first page of a document to be transmitted by facsimile and indicates the number of pages of documents. The counter 114 counts up every time the feeder 101 feeds documents one by one. Note that the page count information holding section 113 comprises a semiconductor memory such as a RAM or the like, and the counter 114 is implemented by a counter IC or a CPU which executes a program stored in a ROM or the like using a RAM as a work memory.

FIG. 12 is a flow chart showing the scan content informing process to be executed by the information processing apparatus. This process is executed when, for example, the feeder 101 begins to feed a document.

A count value of the counter 114 is reset to zero (S1201). It is determined based on information which is obtained from the feeder 101 and indicates if a document to be fed is present, whether or not a document to be read is present (S1202), and whether or not the document to be read is the first page (S1203). If the document to be read (first page) is present, the control waits for image data of the next document input from the scanner 102 (S1204).

If the image data of the next document is input from the scanner 102, the OCR processor 103 recognizes a character string indicating page count information from the image data (S1205), and stores that page count information in the page count information holding section 113 (S1206). The counter 114 is counted up (S1207), and the flow returns to step S1202. If it is determined in step S1203 that the document to be read is not the first page, the flow advances to step S1207 to count up the counter 114. Therefore, steps S1202, S1203, and S1207 are repeated until all documents are read, and the count value of the counter 114 indicates the actual number of pages of the document.

After all the documents are read, the omission checking section 111 checks if the page count information (e.g., 8), which is chosen by the character string chooser 105 from a character string, e.g., "eight pages including a cover page", which is held in the page count information holding section 113, i.e., the number of pages described on the first page of the document, matches the actual number of pages of the documents based on the count value of the counter 114 (S1208). If the two values match, the speech synthesizer 106 generates a message "all eight pages of documents are ready" or the like (S1209), and the speech output section 107 outputs that message (S1210). On the other hand, if the two values do not match, the speech synthesizer 106 generates a message indicating excess or deficiency of the number of pages of documents, e.g., "the number of pages described on the facsimile header does not match the actual number of pages", "the actual number of pages is larger (smaller) than the number of pages described on the facsimile header", or the like (S1209), and the speech output section 107 outputs that message (S1210).

Note that the difference between the page count information obtained from the character string held by the page count information holding section 113 and the count value of the counter 114 may be calculated, and a message indicating the excessive or deficient number of pages, e.g., "the actual number of pages is larger (smaller) one page than the number of pages described on the facsimile header" or the like may be generated.

The user who listened to this speech output determines whether or not to execute facsimile transmission, and inputs the determination result via the input processor 109. Upon detection of a facsimile transmission execution instruction (S1211), the facsimile apparatus executes facsimile transmission of documents (S1212), thus ending the process. On the other hand, if the user instructs to cancel facsimile transmission (S1211), the facsimile apparatus does not execute facsimile transmission, and the process ends.

Upon counting the number of pages of documents, image data of documents may be stored in a memory, and if the user instructs to execute facsimile transmission in step S1211, the image data stored in the memory may be passed to the FAX processor 112 to execute facsimile transmission.

In the above description, the respective components of each embodiment are combined into a single apparatus. Alternatively, the aforementioned process may be implemented by collaboration of computer apparatuses and processing apparatuses distributed on a network.

In each of the above embodiments, the apparatus comprises the feeder 101. If the apparatus does not comprise the feeder 101, and there are a plurality of documents, the user may feed documents one by one to the scanner 102, and may input information indicating that all documents have been fed to the input processor 109 after he or she has fed all documents.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention the following claims are made.

What is claimed is:

1. An information processing apparatus comprising:
   a reader, arranged to read document images from a document having plural pages;
   a recognition section, arranged to recognize character strings of each document image read by said reader;
   an extractor, arranged to extract information, which includes first character strings indicating contents of respective pages of the document and second character strings indicating page numbers of respective pages of the document, from the recognized character strings; and
   a synthesizer, arranged to synthesize and output speech to indicate a relation between the first and second character strings.

2. The apparatus according to claim 1, wherein the information further includes information indicating a location of each first character string in the respective document images, a character size and color, and a direction of writing, and said extractor stores the extracted information.

3. The apparatus according to claim 1, wherein the first character strings correspond to titles of each page of the document, respectively.

4. An information processing method comprising steps of:
   reading document images from a document having plural pages;
   recognizing character strings of each document image read in the reading step;
   extracting information, which includes first character strings indicating contents of respective pages of the document and second character strings indicating page numbers of respective pages of the document, from the recognized character strings; and
   synthesizing and outputting speech to indicate a relation between the first and second character strings.

5. A computer-executable program stored in a computer-readable medium comprising program code causing a computer to perform an information processing method, the method comprising steps of:
   reading document images from a document having plural pages;
   recognizing character strings of each document image read in the reading step;
   extracting information, which includes first character strings indicating contents of respective pages of the document and second character strings indicating page numbers of respective pages of the document, from the recognized character strings; and
   synthesizing and outputting speech to indicate a relation between the first and second character strings.

* * * * *

UNITED STATES PATENT AND TRADEMARK OFFICE
CERTIFICATE OF CORRECTION

PATENT NO. : 7,318,033 B2
APPLICATION NO. : 10/627639
DATED : January 8, 2008
INVENTOR(S) : Okutani et al.

It is certified that error appears in the above-identified patent and that said Letters Patent is hereby corrected as shown below:

ON THE COVER PAGE

At Item (54), "METHOD, APPARATUS AND PROGRAM FOR RECOGNIZING, EXTRACTING, AND SPEECH SYNTHESIZING STRINGS FROM DOCUMENTS" should read --METHOD, APPARATUS AND PROGRAM FOR RECOGNIZING, EXTRACTING, AND SPEECH SYNTHESIZING CHARACTER STRINGS FROM DOCUMENTS--.

COLUMN 2:
Line 9, "a extractor," should read --an extractor,--.
Line 53, "according" should read --according to--.

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO.         : 7,318,033 B2
APPLICATION NO. : 10/627639
DATED               : January 8, 2008
INVENTOR(S)       : Okutani et al.

It is certified that error appears in the above-identified patent and that said Letters Patent is hereby corrected as shown below:

ON THE COVER PAGE

At Item (54) and Column 1, lines 1-4, "METHOD, APPARATUS AND PROGRAM FOR RECOGNIZING, EXTRACTING, AND SPEECH SYNTHESIZING STRINGS FROM DOCUMENTS" should read --METHOD, APPARATUS AND PROGRAM FOR RECOGNIZING, EXTRACTING, AND SPEECH SYNTHESIZING CHARACTER STRINGS FROM DOCUMENTS--.

COLUMN 2:
Line 9, "a extractor," should read --an extractor,--.
Line 53, "according" should read --according to--.

This certificate supersedes the Certificate of Correction issued October 21, 2008.

Signed and Sealed this

Eleventh Day of November, 2008

JON W. DUDAS
*Director of the United States Patent and Trademark Office*